No. 880,209. PATENTED FEB. 25, 1908.
H. GILLETTE.
ELECTRICALLY OPERATED CLOCK.
APPLICATION FILED MAR. 27, 1907.
6 SHEETS—SHEET 1.
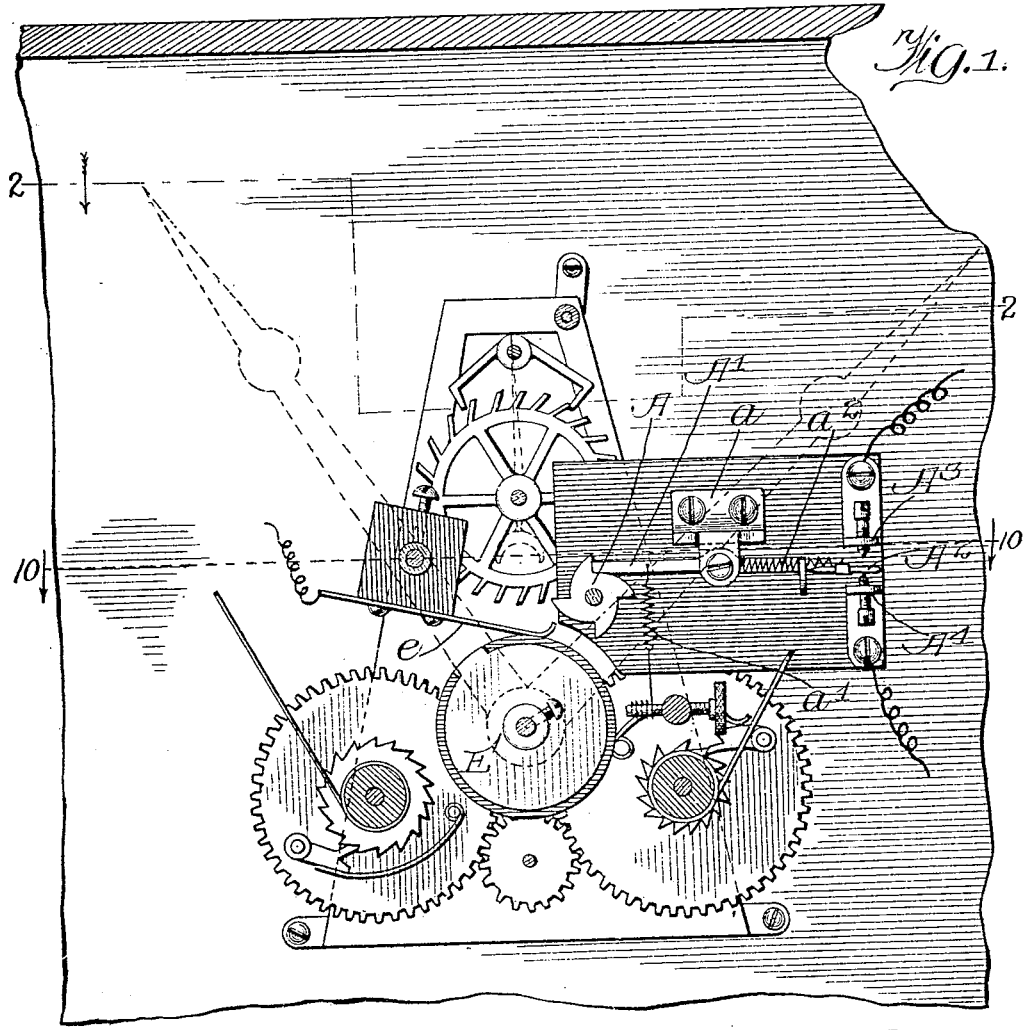
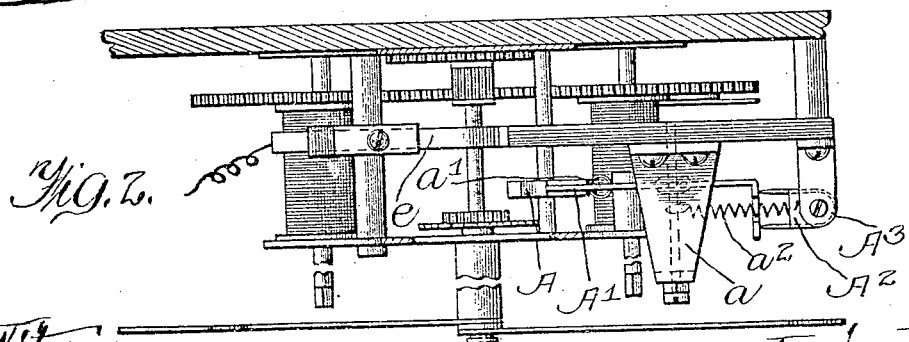
Witnesses:
Inventor:
Harleigh Gillette No. 880,209. PATENTED FEB. 25, 1908.
H. GILLETTE.
ELECTRICALLY OPERATED CLOCK.
APPLICATION FILED MAR. 27, 1907.
6 SHEETS—SHEET 2.
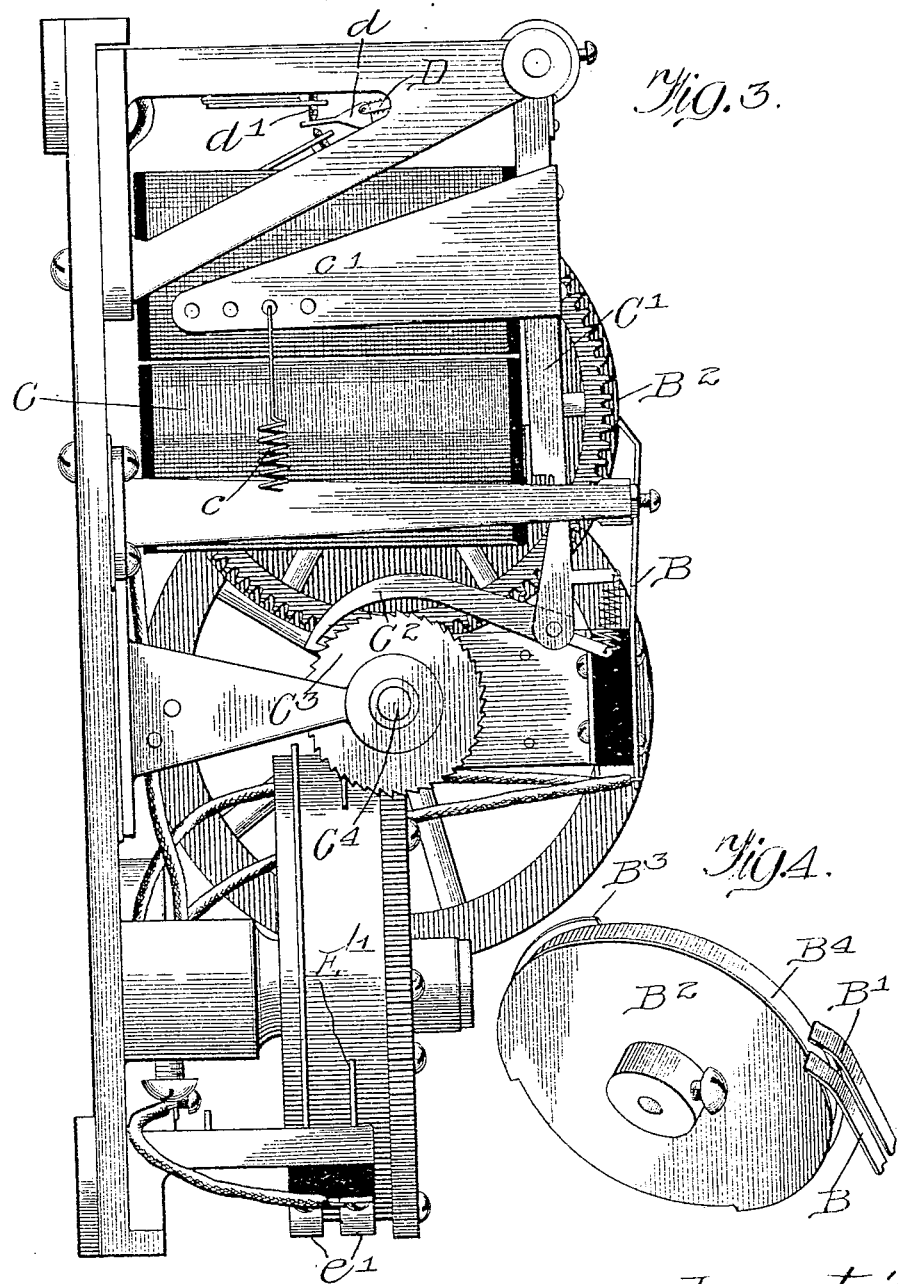

No. 880,209. PATENTED FEB. 25, 1908.
H. GILLETTE.
ELECTRICALLY OPERATED CLOCK.
APPLICATION FILED MAR. 27, 1907.
6 SHEETS—SHEET 3.
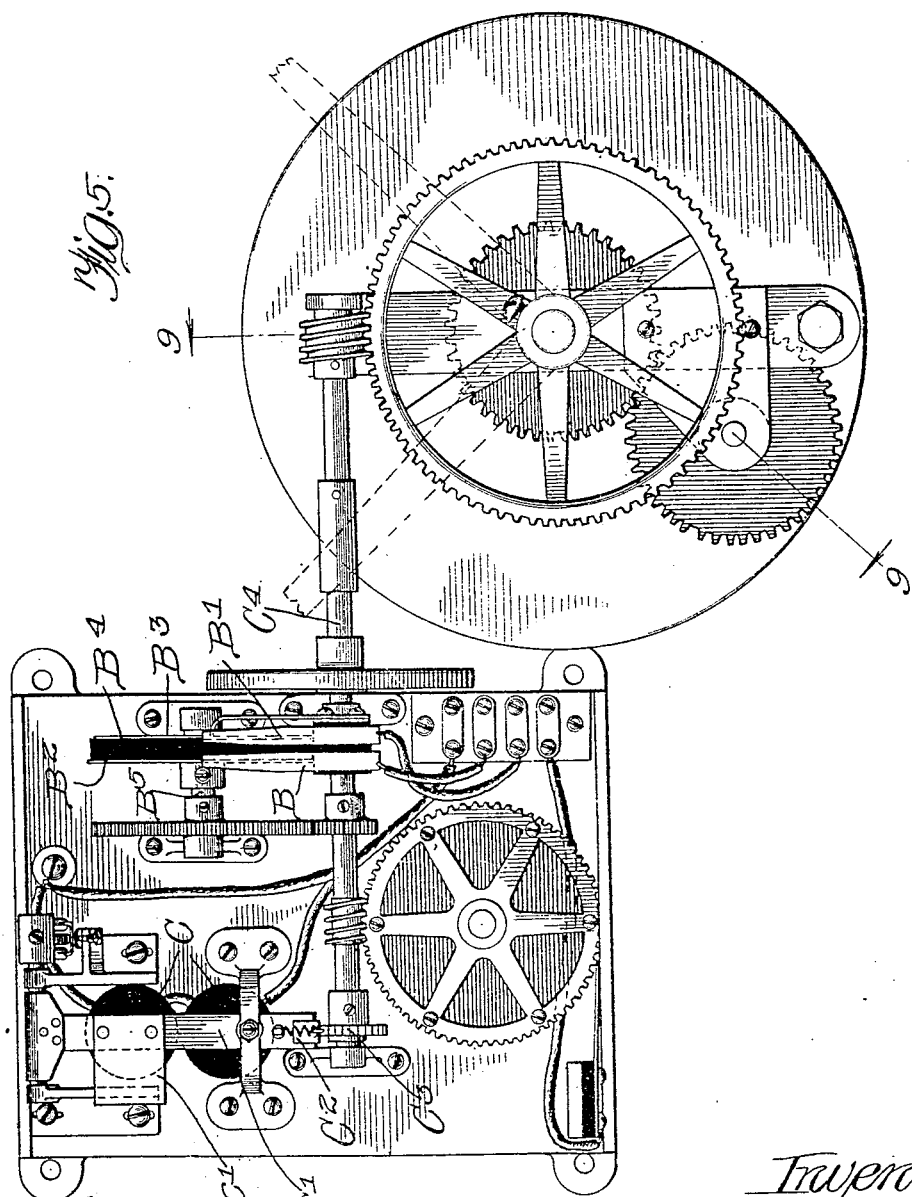

No. 880,209. PATENTED FEB. 25, 1908.
H. GILLETTE.
ELECTRICALLY OPERATED CLOCK.
APPLICATION FILED MAR. 27, 1907.
6 SHEETS—SHEET 4.
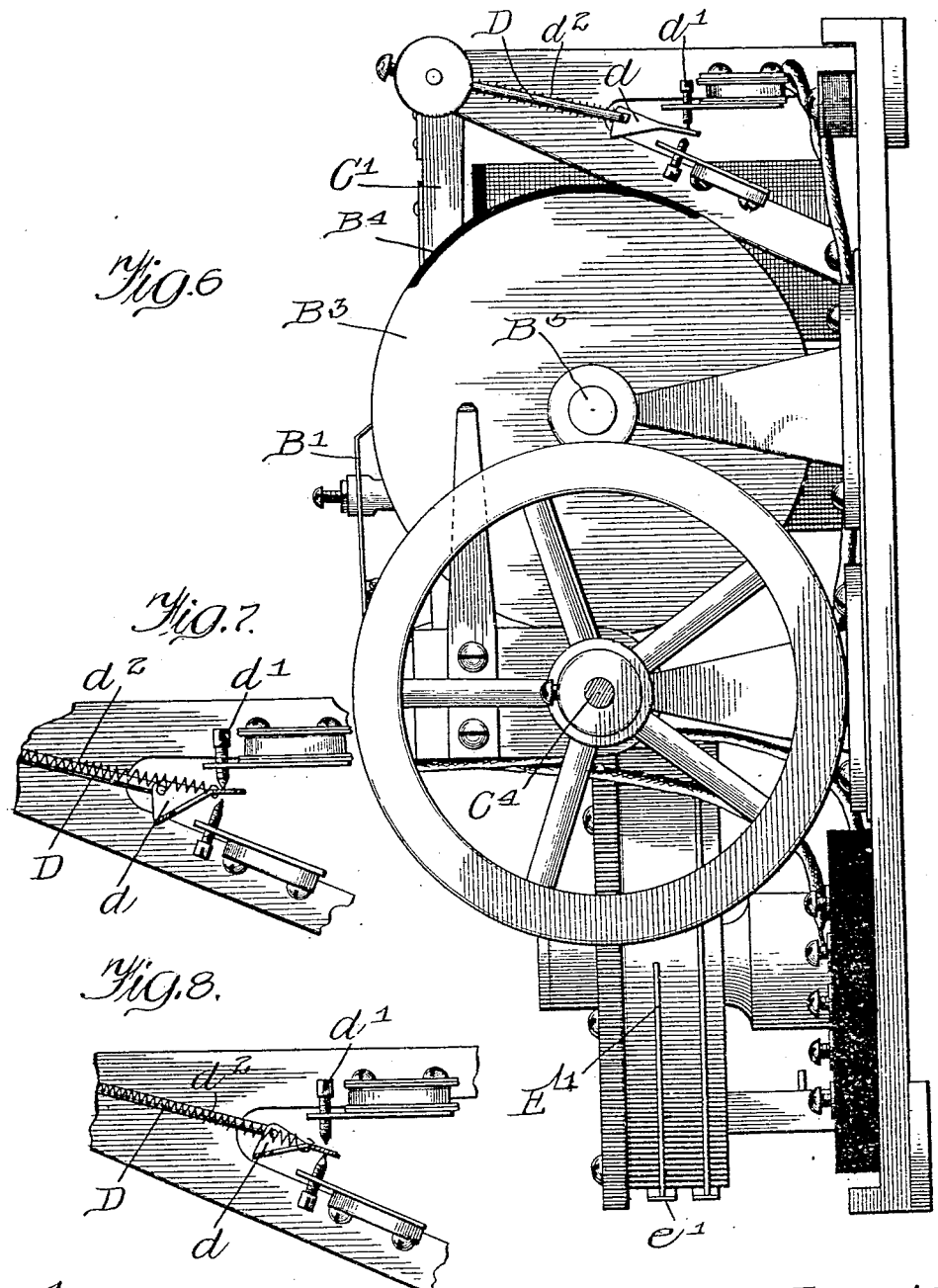

No. 880,209. PATENTED FEB. 25, 1908.
H. GILLETTE.
ELECTRICALLY OPERATED CLOCK.
APPLICATION FILED MAR. 27, 1907.
6 SHEETS—SHEET 5.
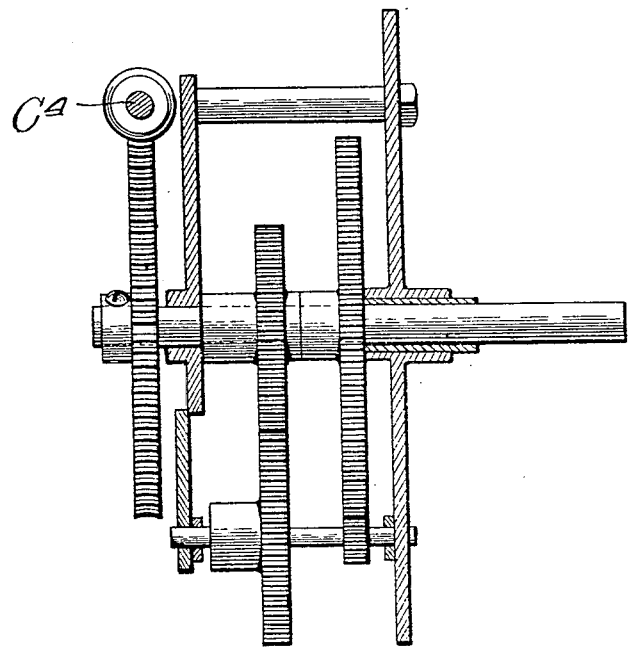
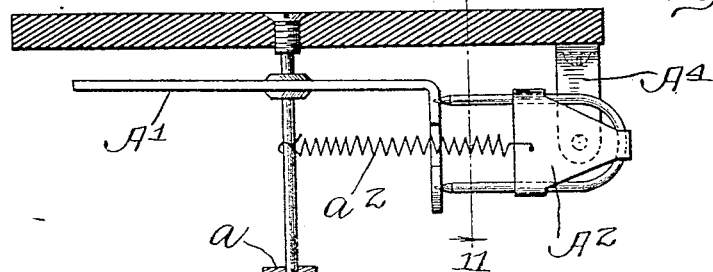
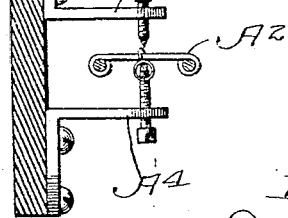
Witnesses:
Inventor:
Harleigh Gillette

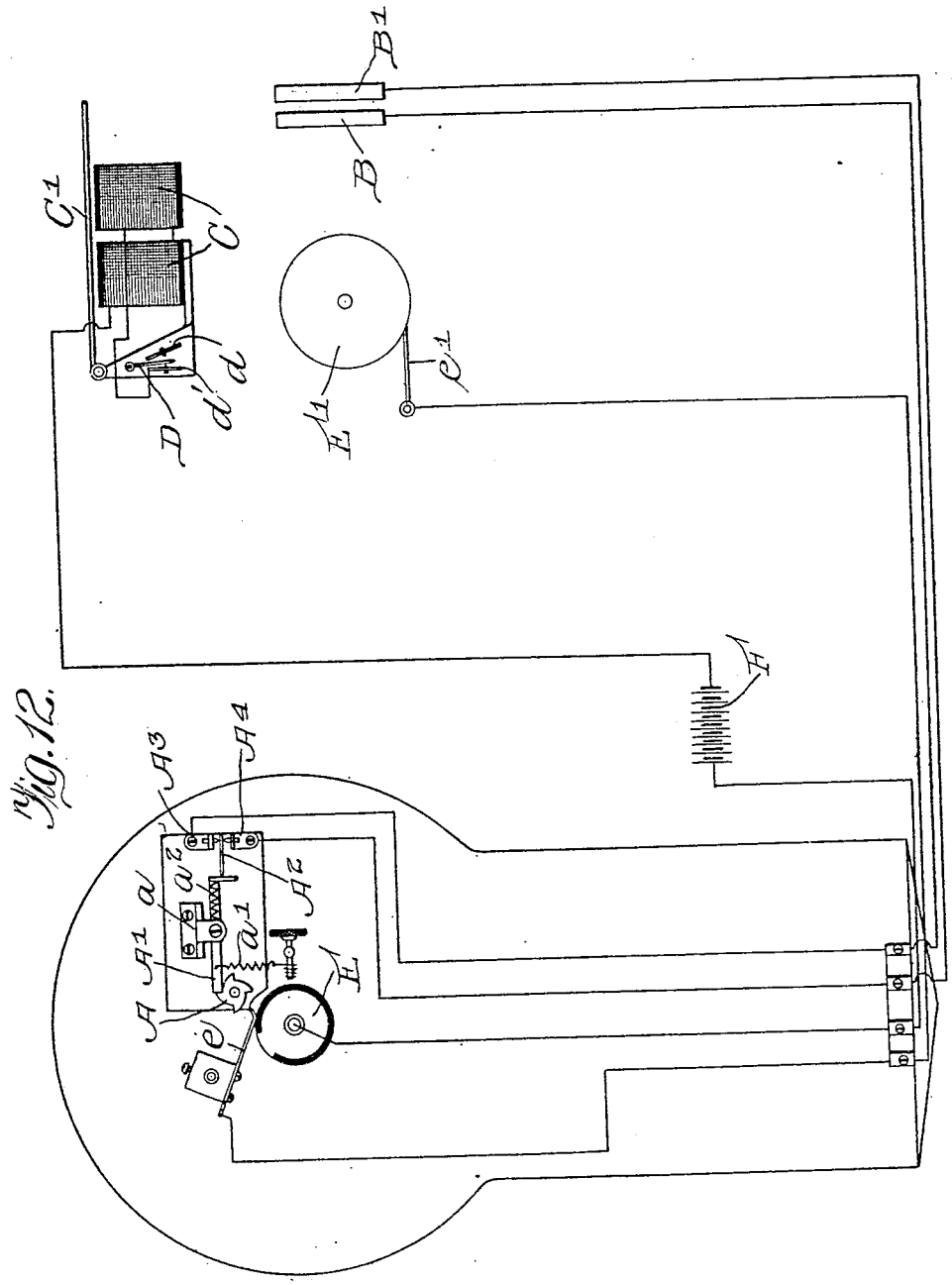

UNITED STATES PATENT OFFICE.

HARLEIGH GILLETTE, OF CHICAGO, ILLINOIS.

ELECTRICALLY-OPERATED CLOCK.

No. 880,209.

Specification of Letters Patent.

Patented Feb. 25, 1908.

Application filed March 27, 1907. Serial No. 364,829.

*To all whom it may concern:*

Be it known that I, HARLEIGH GILLETTE, a citizen of the United States, residing at Chicago, in the county of Cook and State of Illinois, have invented a new and useful Electrically-Operated Clock, of which the following is a specification.

My invention relates to certain new and useful improvements in electrically-operated clocks, and is fully described and explained in the specification and shown in the accompanying drawings, in which Figure 1 is a view in broken elevation of the master clock; Fig. 2 is a horizontal section in the line 2—2 of Fig. 1; Fig. 3 is an end view of the secondary clock; Fig. 4 is a perspective view of the commutator and brushes of the secondary clock; Fig. 5 is a front view of the secondary clock; Fig. 6 is an end view of a portion of the secondary clock, looking in the opposite direction from the view point in Fig. 3. Fig. 7 is a detailed elevation of the motor contact device of the secondary clock; Fig. 8 is a similar view showing the parts in a different position; Fig. 9 is a section in the line 9—9 of Fig. 5; Fig. 10 is a horizontal section in the line 10—10 of Fig. 1; Fig. 11 is a section in the line 11—11 of Fig. 10; and Fig. 12 is a diagrammatic view showing the circuits.

In Fig. 1, which illustrates the master clock, I show portions of an ordinary clock movement having the usual gear wheels, escapement mechanism and other parts, the hands of the clock being shown in dotted lines.

A indicates a cam wheel, which is geared to the clock movement and which, in the form of device herein illustrated, is provided with four cam points and which will ordinarily be arranged to rotate once in eight minutes, or once in twice the number of minutes that the wheel has points. Thus every alternate minute a low point upon the cam passes any given point, while at the intermediate periods of time high points of the cam are successively presented at like intervals. Upon the frame of the master clock I place a bracket, $a$, which carries a lever, $A^1$, one end of which bears against the cam wheel, A, so that as the cam wheel rotates the lever, $A^1$, will be rocked on its pivot at two-minute intervals, the lever reaching its extremes of movement at one-minute intervals. The lever is held in engagement with the cam wheel by a spring, $a^1$, suitably adjustable. Projecting from that end of the lever, $A^1$, farthest removed from the cam wheel, A, is a contact piece, $A^2$, having a pivotal bearing against the end of said lever. A spring, $a^2$, connects a point on the contact piece, $A^2$, beyond its pivot upon the lever, $A^1$, with a point upon said lever or its shaft, to the opposite side of the pivot of the contact piece thereon. This spring always tends to draw that point upon the contact piece to which it is attached toward the opposite end of the spring, and thus at all times exerts a rotary pressure upon the contact piece with reference to the lever, $A^1$, the direction of the rotary force depending upon which side of the pivot between the contact piece and the lever the spring lies.

The contact piece lies between two stationary but adjustable contact points, $A^3$, $A^4$, insulated from each other and from the body of the master clock mechanism. When the end of the lever, $A^1$, rides up upon one of the points upon the cam, A, the right hand end of said lever as viewed in Fig. 1 is depressed. The contact piece, $A^2$, will, at such times be in contact with the lower contact point, $A^4$, and the depressing of the right hand end of the lever, $A^1$, will throw the pivot between the lever and the contact piece below the line of the spring, with the result that the contact piece will snap up, quickly breaking the contact between itself and the contact point, $A^4$, and making a quick contact with the contact point, $A^3$. As the cam, A, continues to rotate, the end of the lever will presently snap off one of the teeth, dropping to its lower position, and this action will raise the right hand end of the lever, causing the pivot between the lever and contact piece to rise above the line of the spring, so that the contact piece makes another quick movement back to the contact point, $A^4$. It will be understood in the operation of this device that one contact or the other will be made every minute as long as the master clock is in operation.

Referring now to Fig. 12, which shows the circuit diagrammatically, it will be seen that the two contact points, $A^3$ and $A^4$, are respectively connected by wires, which may be of any suitable length, with two brushes, B and $B^1$ respectively, the said brushes bearing upon segments, $B^2$ and $B^3$ respectively secured to opposite sides of a disk, $B^4$, (Fig. 4), mounted upon a countershaft, $B^5$, suitably journaled upon a base-plate carrying certain parts of the secondary clock. It will be seen that the two segments, B², and B³, are made in the form of metallic disks having notches of somewhat less angular scope than 180 degrees cut in their peripheries, so that one of the two brushes will always be bearing against one of the segments, and at certain times the brushes will be bearing upon both segments. The notches in the peripheries of the segmental plates are arranged diametrically opposite to each other, so that when the disk, B⁴, is rotated, to such an extent as to draw one of the brushes off its segment on to the surface of the insulating disk, the other brush will have passed on to a corresponding raised or metallic portion of its appropriate segment.

Adjacent to the shaft, B⁵, and upon the same base which supports the brackets in which said shaft is journaled, I mount an electro-magnet, C, above which is pivoted an armature, C¹, normally held away from the magnet by means of a spring, c, engaging the plate, c¹, secured to said armature. The free end of the armature, C¹, carries a pivoted pawl, C², held in engagement with a ratchet wheel, C³, upon a secondary clock main shaft, C⁴. The shaft, B⁵, is driven from the shaft, C⁴, by means of intermeshing gears, as illustrated.

In order to insure rapid and frequently-repeated action of the magnet at the desired time, I secure to the armature a movable lever, D, to the end of which is pivoted a contact piece, d, the contact piece, d, being adapted to contact with a contact point, d¹, and being provided with a spring, d², connected to the lever, D, or its pivot, so that the same action is obtained as in the case of the contact piece A², already described, in the master clock. When the armature moves down the lever, D, swings backward, or to the right as viewed in Fig. 6, and this action swings the pivot between the lever, D, and the contact piece, d, to the rear of the spring connecting the two parts, so that the contact piece snaps away from the contact point, d¹, striking a suitable adjustable stop provided to receive it. Upon the upward movement of the armature the opposite swing of the lever, D, takes place, causing reverse movement of the contact piece and reëstablishment of the contact so that the magnet is again energized and the armature again drawn down.

The electrical circuit embodying the part so far set forth, can now be explained, so as to make clear the operation of these parts.

F, (Fig. 12), represents diagrammatically a battery or other source of electric current, and one pole of this battery is connected to one terminal of the electro-magnet, C, the other terminal of the electro-magnet being connected to the contact point, d¹. The armature, and consequently the contact piece carried by the arm which is mounted upon the armature, is grounded upon the frame of the secondary clock. The opposite pole of the battery or source of electric current supply is grounded upon the frame of the master clock and thereby has electrical connection with the contact piece, A². The two segmental disks, B² and B³, are also grounded upon the frame of the secondary clock. It will thus be seen that if the lever, A¹, of the master clock is moved, for instance in the direction to make contact between it and the lower contact point, A⁴, a circuit will be established running from the battery through the frame of the master clock, the lever, A¹, the contact point, A⁴, the wire running therefrom, the brush, B¹, the segmental disk, B³, the frame of the secondary clock, the armature and current-breaking lever of the secondary clock, the contact point of the secondary clock and the electro-magnet of the secondary clock, back to the battery. The establishment of this current sets the armature of the secondary clock in rapid oscillation and causes rotation of the secondary clock mainshaft and with it rotation of the disk, B⁴, and the two segmental disks or segments, B² and B³. This rotary motion will continue until the brush, B¹, runs off the corresponding segment, B³, on to the insulated cylinder, B⁴, at which time the current is broken and the action of the electro-magnet and the further rotation of the secondary clock mainshaft ceases. During this operation the other brush, B, which started in contact with the cylinder, B⁴, of non-conducting material, has passed off said cylinder and has come to rest upon the other segment, B², so that when the lever, A¹, moves in the opposite direction and sets up contact with the upper contact point, A³, the same kind of a circuit will be set up with the exception that it will pass through the brush, B, and the segment, B², instead of through the brush, B¹, and the segment, B³. In other words, each time a contact is made in the master clock with either one of the contact points the electro-magnet in the secondary clock sets the mainshaft thereof in motion, and such motion is continued until the current is automatically broken, the rotation during this period connecting other parts of the circuit, so that when a contact is made in the master clock at another point, the parts of the secondary clock will be in position for the current to flow.

The secondary clock mainshaft, C⁴, is connected by suitable gearing, which it is not necessary to describe particularly, but which is fully illustrated in Fig. 5, with the hands of the secondary clock, and the gearing is so proportioned that each operation of the secondary clock mainshaft caused by the periodic operation of the electro-magnet, C, as set forth, will move the hands forward one minute. Of course it will be obvious that the electro-magnet, C, the armature therefor, the pawl and ratchet operated thereby, and the mechanism for rapidly interrupting the current, constitutes merely one form of an electric motor, and that without varying the system herein shown to any material extent other forms of motors can be substituted for the one shown, although I prefer to use the one herein illustrated, and it embodies certain features which I consider important in my invention.

The general operation of the structure then, can be set forth as follows:—Every minute one circuit is closed in the master clock, and the circuit-closing device in the master clock remains closed for one minute, when it is broken and the other circuit is closed in the master clock. The moment either circuit in the master clock is closed, the motor of the secondary clock begins to operate, and it continues in operation until the hands of the secondary clock have moved forward one minute, at which time the circuit is broken in the secondary clock and the other circuit, which is meanwhile open in the master clock is closed in the secondary clock.

In order to insure periodic synchronization between the two clocks, I provide in the master clock a segment, E, which makes a complete rotation once per hour, and a brush, e, bears against this segment, the segment, E, having a short section of conducting material and having the main portion of its circumference of insulating material, as illustrated in Fig. 12. The segment, E, is electrically connected with the frame of the master clock, and the brush, e, is connected with a brush, e¹, which bears upon a segment, E¹, grounded upon the frame of the secondary clock and having means by which it is rotated once for every period of one hour's rotation of the secondary clock main shaft, C⁴. The interruptions of the segments, E and E¹, are so arranged with respect to each other that if the secondary clock is in proper position, the circuit running from the frame of the master clock through the segment, E, the brush, e, the brush, e¹, the segment, E¹, the frame of the secondary clock and the motor, back to the battery, will be broken at the secondary clock by the brush, e¹, running off the segment, E¹, just at the time when the circuit is completed at the master clock, by the brush, e, running on to the segment, E, at that point. Thus, if the secondary clock is in proper position, this synchronizing circuit will be wholly without function. On the other hand, if the secondary clock has for any reason lagged behind the master clock, as it might conceivably do, the closing of the circuit at the master clock will occur before its break in the secondary clock, and the current which is thereupon set up will cause the motor to operate until the secondary clock reaches the proper position and has caught up with the master clock.

In the foregoing description of the clock, I have set forth with considerable detail the various mechanisms which are believed by me to possess elements of novelty, and have referred only in general terms to the clock movements, gear trains and the like, which can very obviously be of well-known construction and can be varied to an almost unlimited extent without departing from the spirit of my invention.

The mechanisms particularly used in carrying out my invention are obviously capable of great modification without departing from their essential principle, and by describing them in detail I do not intend to limit myself specifically thereto, except as pointed out in the following claims.

What I claim as new and desire to secure by Letters Patent, is:—

1. The combination with a master clock movement, of a secondary clock motor, time-indicating means, connections between the time-indicating means and said secondary clock motor, electrical connections including the motor, means controlled by the movement of the master clock movement for regularly and alternately setting up two different electrical states in the connection, said secondary clock motor being constructed and arranged to be operated in the same direction during each of said electrical states, mechanical means operatively driven by the movement of the motor for interrupting each electrical state after a predetermined movement, whereby the motor is stopped, and mechanical means operatively driven by the motor whereby such movement of the motor shall set devices in the secondary clock in such position that the motor can respond to and be moved by the next succeeding electrical state in the connections.

2. The combination with a master clock movement, and a secondary clock motor, of time-indicating means and connections between the same and said motor, two electrical circuits from the master clock including the secondary clock motor, means at the master clock and operated by the movement thereof for periodically and alternately closing one circuit and breaking the other, whereby the motor will be periodically set in motion, and means mechanically driven by the motor after a certain movement for opening the closed circuit which is operating the motor and closing the circuit which is open at the master clock, whereby the parts are in position for the closing of the circuit which is open at the master clock to actuate the motor.

3. The combination with a master clock movement and a secondary clock motor, of time-indicating means and connections between the same and said motor, two electrical circuits from the master clock including the secondary clock motor, means at the master clock and operated by the movement thereof for periodically and alternately closing one circuit and breaking the other, whereby the motor will be periodically set in motion, means operated by the motor after a certain movement for opening the closed circuit which is operating the motor and closing the circuit which is open at the master clock, whereby the parts are in position for the closing of the circuit which is open at the master clock to actuate the motor, a third or synchronizing circuit including the motor, means operated by the movement of the master clock for closing said synchronizing circuit at longer intervals, and means movable with the secondary clock motor for holding said synchronizing circuit closed until the secondary clock reaches a position synchronous with the master clock, and then breaking it to stop the motor, the circuit being broken at the master clock by continued movement thereof before it is again closed at the secondary clock.

4. The combination with a master clock movement, a secondary clock motor and two circuits including the secondary clock motor, of means operated by the master clock movement for alternately closing one of said circuits and opening the other thereof, two segments movable by the motor, each of said segments being included in one of said circuits, and two brushes, one adapted to bear on each segment and included in the circuit thereof respectively, the brushes and segments being constructed and arranged so that when one circuit is closed at the master clock, the current will flow through the corresponding brush and segment, driving the motor for a predetermined space, at the end of which the brush will pass off the segment, opening the circuit, the other segment being meanwhile advanced into contact with its brush to close its circuit at the secondary clock preparatory to a second operation of the master clock.

5. The combination with a master clock movement, a secondary clock motor and two circuits including the secondary clock motor, of means operated by the master clock movement for alternately closing one of said circuits and opening the other thereof, two segments movable by the motor, each of said segments being included in one of said circuits, two brushes, one adapted to bear on each segment and included in the circuit thereof respectively, the brushes and segments being constructed and arranged so that when one circuit is closed at the master clock, the current will flow through the corresponding brush and segment, driving the motor for a predetermined space, at the end of which the brush will pass off the segment, opening the circuit, the other segment being meanwhile advanced into contact with its brush to close its circuit at the secondary clock preparatory to a second operation of the master clock, a synchronizing circuit including the motor, a segment located at each clock and included in the circuit, said segments being driven by the master clock and the secondary clock motor respectively, brushes included within the synchronizing circuit and bearing upon said segments respectively, said segments being so constructed and arranged that when the circuit is closed at the master clock it will drive the secondary clock motor until said secondary clock reaches a corresponding position therewith, whereupon the circuit will be broken by the passage of the brush from the segment at the secondary clock.

6. The combination with a master clock movement, of a cam wheel driven thereby, an oscillating member bearing on the cam wheel, a movable contact point carried by the said oscillating member, two circuits, stationary contacts forming terminals of said circuits and adapted to be engaged alternately by the movable contact point on said oscillating member, a secondary clock motor in each circuit, and means operated by the motor after a predetermined movement for opening the closed circuit which is operating the motor and closing the circuit which is open at the master clock, whereby the movement of the motor is stopped and the parts are set in position for the closing of the other circuit at the master clock to again operate the motor.

HARLEIGH GILLETTE.

In presence of—
RALPH A. SCHAEFER,
J. H. LANDES.